Oct. 18, 1949.  C. E. NICOLET  2,485,010
FASTENER STRUCTURE
Filed April 5, 1945  2 Sheets-Sheet 2
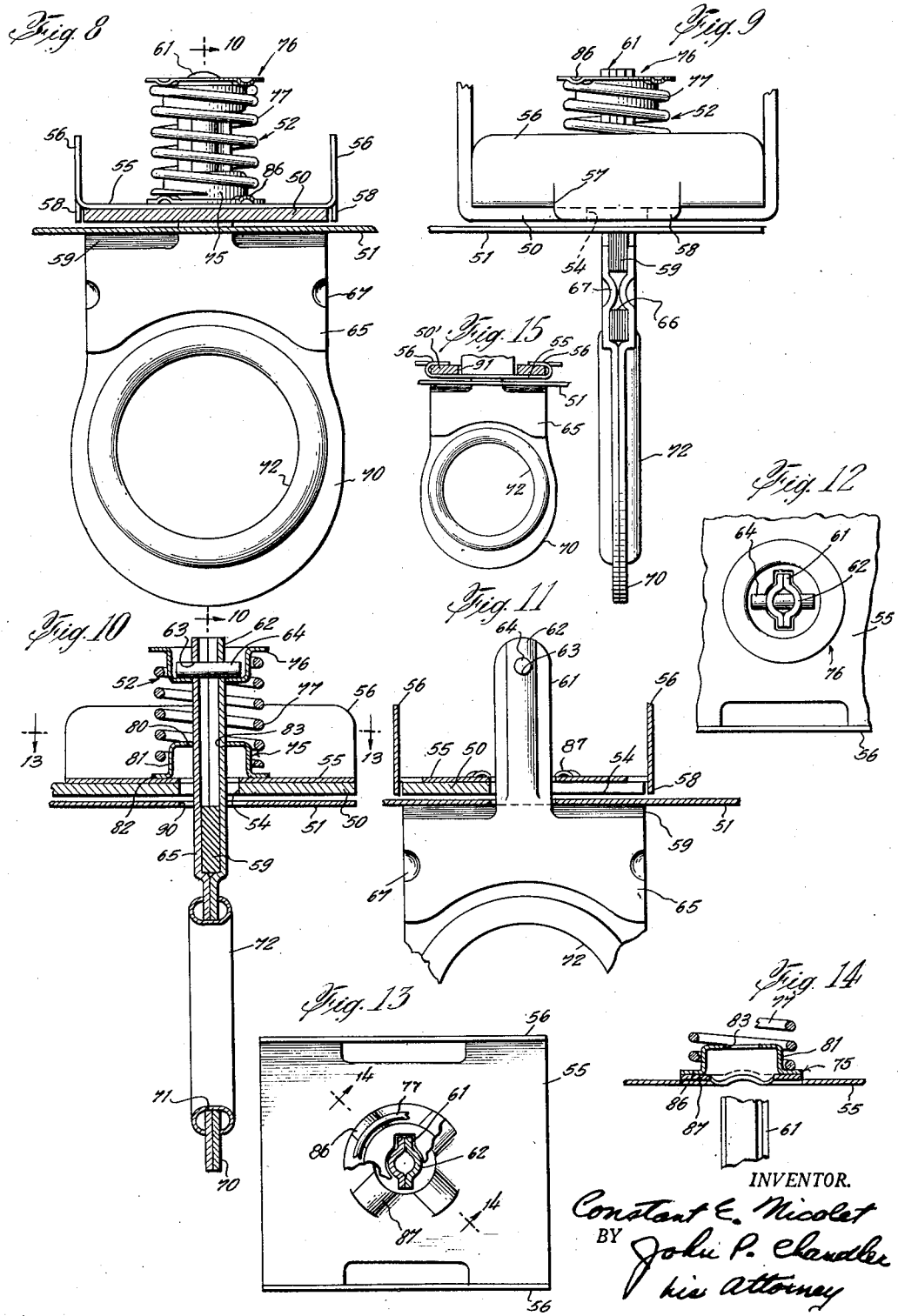
INVENTOR.
Constant E. Nicolet
BY John P. Chandler
his attorney

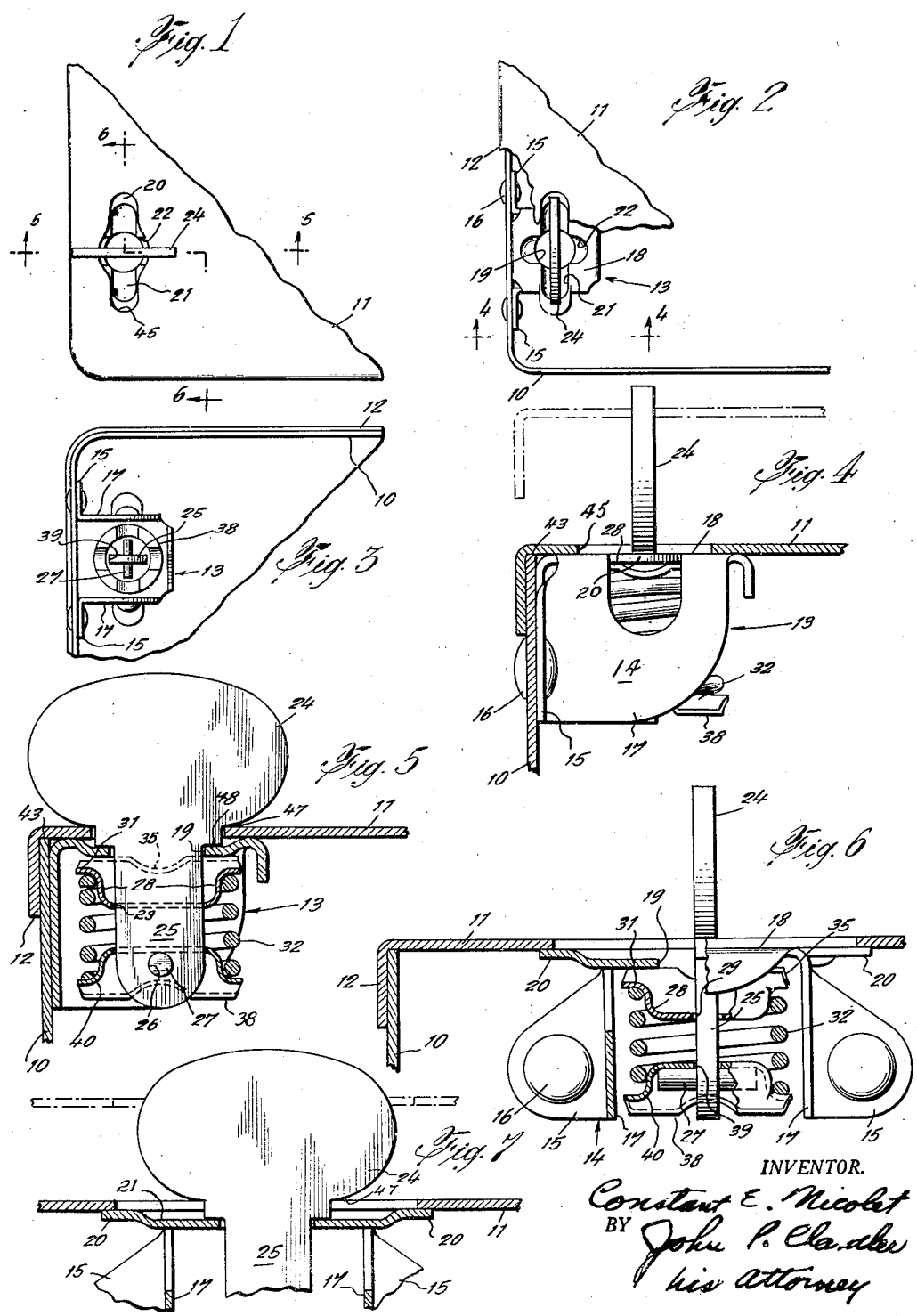

Patented Oct. 18, 1949

2,485,010

UNITED STATES PATENT OFFICE 2,485,010

FASTENER STRUCTURE

Constant E. Nicolet, Westport, Conn., assignor to Camloc Fastener Corporation, New York, N. Y., a corporation of New York Application April 5, 1945, Serial No. 586,711

2 Claims. (Cl. 24—221)

This invention relates to new and useful improvements in fasteners of the quick-acting type, and has for its principal object the provision of a novel fastener for securing box covers to boxes, plates to fixtures, and for other similar uses, wherein excessive vibration is not a factor and relative ease and speed of fastening and unfastening is an important consideration.

The fastener of the present invention is essentially one wherein one of the members, such as a junction box, carries the entire fastener unit which includes a rotatable stud having a relatively wide head which passes through an oblong opening in the other member, in this case, the cover for the junction box. Thus, when the head of the stud is rotated through an arc of 90°, the cover is securely locked in place and improved locking detents prevent casual rotation of the stud.

In one form of the invention, the fastener unit is adapted to be riveted, welded or otherwise affixed to a surface located at an angle to the member to be secured thereto, such as to the side wall of a box, to secure the cover to the box. When two substantially flat, plate-like members are to be secured in substantially parallel relation, a slightly-modified form of fastener unit embodying the present invention may be affixed to one of the members, and the head of a rotatable stud may pass through an opening in the other member. In either type of assembly the head of the stud, which performs the fastening function, has spring means for yieldingly urging the members together.

Another object of the invention is to provide a fastener of the general character described which is easily and inexpensively fabricated, which cannot readily get out of order, and which may be employed in a large variety of applications.

In the drawings:

Fig. 1 is a broken top plan view showing a corner section of a junction box equipped with a fastener of the present invention, the view showing the cover section in place and the fastener parts in locked position.

Fig. 2 is similar to Fig. 1, but shows portions of the cover section broken away.

Fig. 3 is a bottom plan view of the fastener structure.

Fig. 4 is a broken vertical section taken on line 4—4 of Fig. 2.

Fig. 5 is a broken vertical section taken on line 5—5 of Fig. 1.

Fig. 6 is a broken vertical section taken on line 6—6 of Fig. 1.

Fig. 7 is an enlarged broken section showing certain details of the construction of the fastener, the view showing the stud occupying a position at right angles to that shown in Fig. 5.

Fig. 8 is a broken vertical section through a modified form of fastener.

Fig. 9 is an elevation taken at right angles to the showing of Fig. 8.

Fig. 10 is a vertical section taken on line 10—10 of Fig. 8.

Fig. 11 is an elevation, partially in section, taken at right angles to the showing of Fig. 10, certain elements, such as the detent washers and the spring, being omitted from the view.

Fig. 12 is a fragmentary top plan view of the structure shown in Fig. 10.

Fig. 13 is a section taken on line 13—13 of Fig. 10.

Fig. 14 is a broken vertical section taken on line 14—14 of Fig. 13.

Fig. 15 is a view similar to Fig. 8, but showing a modified method of application of the unit.

Referring now more particularly to Figs. 1 to 7, 10 indicates one corner section of a junction box which may be formed from metal, plastic, or other suitable material. The box may, if desired, be generally rectangular in shape, and may be provided with a cover 11 having depending flanges 12 extending around the sides thereof, and which relatively closely fit the side walls of box 10. The fastener structure, which is designated generally by the reference numeral 13, is a composite unit adapted to be mounted or affixed solely to the junction box, and is formed so that no part need be mounted on the cover 11. It will be appreciated that one of the fastener structures may, if desired, be positioned at each corner section of the box.

In the specific form shown, the fastener structure includes a bracket 14 which may be stamped from sheet metal and may comprise lateral portions 15—15 which lie on a common plane, and may be secured to the side wall of the junction box by any suitable means such as by rivets 16, Formed adjacent the lateral portions 15 are opposed, substantially-parallel, spaced wall portions 17—17 which are connected at their upper ends by a generally-flat top portion 18. In order to make the fastener structure of generally small dimensions and, at the same time, provide means for completely closing the opening in the cover through which the locking element extends, there are struck out from the opposed side wall sections 17—17 laterally-extending portions 20—20. Formed centrally of the flat top surface 18 is a substantially-circular opening 19, and extending radially therefrom are a pair of recesses 21, and at right angles to such recesses are a second pair of somewhat shorter recesses 22. On the lower surface of top portion 18 the recesses 21 and 22 form locking stops, the purpose of which will be described.

In this bracket structure 14, which is preferably formed from sheet metal, the stud element is mounted. The stud, which is secured for rotation within the bracket, is preferably formed as a stamping from sheet metal, and is formed at its upper end with laterally-extending portions forming an elongated head 24, and a downwardly-extending shank 25 provided at its lower end with an opening 26 which receives a cross-pin 27.

In order to provide a suitable locking element for engagement with the locking stops 21 and 22, and also to act as a centering and retaining element for a spring member, a separately-formed cup 28, shown particularly in Figs. 5 and 6, is provided. This cup may also be stamped or otherwise formed from sheet metal, and comprises a bottom surface having a central opening 29 of generally rectangular shape through which shank 25 passes. An annular flange 31 extends upwardly from the marginal edges of the lower portion, and provides a seat for the upper end of a coil compression spring 32. On the upper surface of flange 31 there are formed, at 90° intervals, detents 35 which receive locking stops 21 and 22.

The fastener unit further comprises a lower cup 38 having a central opening 39 through which the shank passes, the cross-pin 27 engaging the lower surface of the such cup. The cup further includes a downwardly-extending annular flange 40, the upper surface of which receives the lower end of spring 32. To the end of reducing die cost, cups 28 and 38 may be identical, and accordingly the recesses shown on the lower surface of cup 38 in Fig. 3 serve no purpose.

In assembling the fastener to form the composite unit 13, the shank 25 of the stud is first passed through the circular opening 19 of the top wall of the bracket. Then, cup member 28 with its flange 31 extending upwardly is passed onto the shank 25. Thereafter, coil spring 32 is placed over the stud, and then lower cup 38 is mounted on the stud, and cross-pin 27 secured in place. This operation is usually accomplished by compressing lower cup 38 against the spring until it has cleared the hole 26. Thereupon, securing pin 27 is placed through the hole. The fastener is then a composite unit ready for mounting.

Due to the manner in which bracket 14 is formed, the mounting of the fastener on the box is greatly facilitated. Since the major portion of top area 18 of the bracket is flat, it is only necessary to place this surface in line with upper edge 43 of box 10. In other words, as shown in Fig. 5, the top edge 43 of box 10 is in the same plane as the top surface 18 of bracket 14.

The opening 45 in the cover plate 11 is generally oval or elongated in shape, having its major axis substantially greater than the minor axis, as shown in Fig. 1. The major axis is formed sufficiently long to accommodate the length of stud head 24, and consequently, after the cover is placed over the stud head, it is only necessary to rotate the stud through 90°, at which point the bottom of the stud head itself will seat securely against the top of the cover in line with the minor axis of the elongated opening, and thus hold the cover securely in place. As will be observed, the stud head 24 is formed on its lower surface adjacent its shank 25 with a generally-curved line 47, and due to this curve or contour, the stud, as it is being rotated from its open to its closed position, cams against the edge of the cover opening and rides up to the cover without the requirement of any axial pull on the stud head.

Between the lower ends of curved edges 47 and the shank 25, there are formed substantially-square portions 48 which are received within recesses 21 and 22. It will thus be apparent that two locking actions are afforded. That is to say, portions 48 drop into recesses 21—22, and the lower surfaces of such recesses form locking stops which drop into detents 35 in the cup 28.

In Figs. 1 and 5, the stud head is shown in its closed position riding on top of the cover 11 and holding it securely in place. In this position, the locking stops 22 are in engagement with the corresponding locking detents 35. It will be noted from an examination of Fig. 1 that the lateral extensions 20, which have been struck from wall sections 17 of the bracket, effectively close opening 45 in cover 11. It will further be appreciated that spring 35 affords an approved measure of tension between curved surface 47 of head 24 and the marginal edges of opening 45 in cover 11.

Referring now to Figs. 8 to 15, inclusive, there is shown an alternative form of structure differing from the structure previously described in certain respects. In these views, the fastener is shown as securing together two plate elements 50 and 51. One particular use for this modified fastener is in connection with the mounting of a reflector on a fluorescent lighting fixture. Reflectors of this character are generally of a length slightly in excess of the fluorescent tube, and usually have a polished surface. In most instances of this character, two fasteners of the type shown are employed, one adjacent each end of the reflector. Plate 51 may be considered as the reflector, and plate 50, the bracket which is supported in fixed relationship to the fixture. The precise shape of the bracket forms no part of the present invention, but in general it may be stated that it is a U shaped affair, as shown in Fig. 9, supported at its free terminals to the fixture, and depending downwardly therefrom. Thus, plate 50 may be considered as the base of the bracket.

In the event that the general fastener unit, designated as 52, is to be readily detachable from the plate 50, such plate may be formed with a slot 54 extending inwardly from one side thereof, as shown in Figs. 10 and 11. If, on the other hand, the fastener unit is to be more or less permanently secured to the bracket, the arrangement of Fig. 15 may be employed, which will be later referred to. The fastener unit includes a strike plate 55 having upwardly-turned terminals 56—56. Prior to bending these terminals upwardly to the position shown in Figs. 8 and 9, there is struck from the metal a portion of the contour shown at 57 in Fig. 9. Accordingly, when the terminals are bent upwardly, there are formed downwardly-disposed flanges 58—58 which effectively retain the strike plate in position on bracket 50 under all conditions, except when it is desired to remove the fastener unit from the bracket 50.

Inasmuch as the reflecting surface of the reflector would be damaged by contact between the metal of the laterally-extending portions of the head of the stud, if a stud of the type illustrated in Fig. 1 were employed, it is preferred to form the stud with an insert 59 of fiber or other resilient material which will not scratch or otherwise deface this reflector surface. To accomplish this, the stud is preferably formed from two identical plates which may be stamped from sheet metal having the general contour shown in Figs. 8 to 11. Each of these identical plates includes a shank portion 61, the central portion of which is curved, as shown at 62 in Figs. 12 and 13. Thus, when the two members are placed together, the general contour of the upper end of the stud will be circular, and adjacent its upper end the stud has an aperture 63 which receives cross-pin 64, the circular construction giving additional support to the cross-pin.

Below the shank portion, the metal is struck outwardly, as shown at 65, to provide a recess between the two plates to receive the fiber insert. This insert is generally rectangular in shape and has notches 66 at opposite ends thereof, the adjacent portions of the plates being pinched, as shown at 67, thus firmly retaining the insert within the recess formed between the plates. The stud is further formed at its lower end with a generally circular handle portion 70 which has a relatively large central opening 71 therein, and the two plates are then secured together by means of a grommet 72 which is mounted in the manner shown in Fig. 10.

A pair of detent washers 75 and 76, which may be of identical construction, receive therebetween a coil compression spring 77. These washers comprise central portions 80, vertical flanges 81, and horizontal flanges 82. The central portion 80 of each detent washer is provided with an opening 83 of the same general contour as the cross-sectional shape of the two-piece shank of the stud assembly. On each outer, horizontal flange 82 there are formed at 90° intervals, recesses or detents 86 which receive and cooperate with raised portions 87 formed on the upper surface of plate 55.

The parts may be assembled in the same manner as was outlined in the first embodiment of the invention, and when fully assembled, the unit may be mounted on plate 50 which is the lower wall of the fixed bracket. This may be accomplished by compressing spring 77 between detent washers 75 and 76 in order to enable the left-hand flange 58, when viewed as in Fig. 8, to ride over the upper surface of plate 50 while the shank of the stud assembly is being moved to the inner end of slot 54. When the shank has reached this central position relative to plate 50, the spring may be released, and flanges 58 on opposite sides of the plate retain the unit in this position.

Plate 51 which may, as was earlier pointed out, be the reflector in a fluorescent lighting unit, will be formed with a rectangular opening 90 of sufficient width and length to permit the entire head of the shank, including grommet 72, to pass therethrough. When the stud is then rotated through an angle of 90°, the fiber insert 59 will be positioned at right angles to slot 90 and engage the lower surface of the plate 51, thus securing the plate in proper position.

In the event that it is desired to secure the stud assembly more permanently to the supporting bracket, the lower surface of such bracket, designated in Fig. 15 as 50″, is formed with a central opening 91. To assemble the unit, the shank is passed upwardly through opening 91, and then opposed, vertical flanges 56′—56′ are moved inwardly to a horizontal position, thus firmly securing strike plate 55′ to the bracket.

It will be appreciated from the foregoing that the fastening units of the present invention are adapted for securing two members together, which members may be superimposed plates, or may constitute one generally-horizontal plate, and another plate lying in a plane generally at right angles to the horizontal plate, such as in the first embodiment of the present invention. For convenience, in some of the appended claims the head portion of the stud is referred to as being at the upper end of such stud, although it will be appreciated that if the position of the parts is reversed, as in the second embodiment of the invention, the head is at the lower end.

While two forms or embodiments of the invention have been shown and described herein for illustrative purposes, and the construction and arrangement incidental to two specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What I claim is:

1. A fastener unit for securing together a plurality of plates provided, respectively, with an aperture and with an elongated slot, the unit comprising a stud formed at one end thereof with laterally-extending portions forming a head and having a transverse aperture at its opposite end, a cross-pin within such aperture, the stud being journalled for rotative movement in the aperture in the first plate, the head passing through the slot in the second plate and arranged to be rotated through an arc of 90°, and means for urging the laterally-extending portions forming the head into engagement with the second plate to hold the plates together, said means comprising a coil spring carried on the stud, spaced cups carried by the stud engaging the spring at opposite ends thereof, the outermost cup receiving the cross-pin and preventing removal thereof from the aperture, the other cup engaging the outer surface of the first plate, cooperating detent means between said cup and the plate for preventing casual rotation of such cup, and means for preventing relative rotation between such cup and the stud.

2. A fastener unit for securing together a plurality of plates provided, respectively, with an aperture and with an elongated slot, the unit comprising a stud provided at one end thereof with laterally-extending portions forming a head and having a transverse aperture at its opposite end and a cross-pin within such aperture, the stud being journalled for rotative movement in the aperture in the first plate, the head passing through the slot in the second plate and arranged to be rotated through an arc to fastening position, and means for urging the laterally-extending portions forming the head into engagement with the second plate to hold the plates together, said means comprising a coil spring carried on the stud, spaced spring cups carried by the stud and engaging the spring at opposite ends thereof, the outermost cup engaging the cross-pin, the other cup engaging the outer surface of the first plate, detent means formed on the cup, and means on the plate cooperating with said detent means for preventing casual rotation of the stud.

CONSTANT E. NICOLET.

REFERENCES CITED

The following references are of record in the file of this patent:

UNITED STATES PATENTS

| Number | Name | Date |
|---|---|---|
| 1,501,867 | Sadler | July 25, 1924 |
| 1,956,029 | Holmes | Apr. 24, 1934 |
| 2,011,472 | Chobert | Aug. 13, 1935 |

FOREIGN PATENTS

| Number | Country | Date |
|---|---|---|
| 205,785 | Great Britain | June 26, 1924 |
| 330,696 | France | July 6, 1903 |
| 335,957 | Great Britain | Oct. 1, 1930 |